(12) United States Patent
Nishimura et al.

(10) Patent No.: US 10,636,541 B2
(45) Date of Patent: Apr. 28, 2020

(54) CONDUCTIVE PASTE AND METHOD FOR FORMING TERMINAL ELECTRODES OF MULTILAYER CERAMIC COMPONENT

(71) Applicant: SHOEI CHEMICAL INC., Shinjuku-ku, Tokyo (JP)

(72) Inventors: Kousuke Nishimura, Tosu (JP); Naoto Shindo, Tosu (JP); Nobuo Nishioka, Tosu (JP)

(73) Assignee: SHOEI CHEMICAL INC., Shinjuku-ku, Tokyo (JP)

( * ) Notice: Subject to any disclaimer, the term of this patent is extended or adjusted under 35 U.S.C. 154(b) by 0 days.

(21) Appl. No.: 15/765,147

(22) PCT Filed: Sep. 26, 2016

(86) PCT No.: PCT/JP2016/078219
§ 371 (c)(1),
(2) Date: Mar. 30, 2018

(87) PCT Pub. No.: WO2017/057246
PCT Pub. Date: Apr. 6, 2017

(65) Prior Publication Data
US 2018/0290917 A1    Oct. 11, 2018

(30) Foreign Application Priority Data

Oct. 1, 2015  (JP) ................................ 2015-196187

(51) Int. Cl.
| | |
|---|---|
| *H01B 1/22* | (2006.01) |
| *C03C 3/064* | (2006.01) |
| *C03C 3/066* | (2006.01) |
| *C03C 3/068* | (2006.01) |
| *C03C 8/02* | (2006.01) |
| *C03C 8/04* | (2006.01) |
| *C09D 5/24* | (2006.01) |
| *H01B 1/16* | (2006.01) |
| *H01G 4/232* | (2006.01) |
| *C03C 8/18* | (2006.01) |
| *H01G 4/228* | (2006.01) |
| *H01G 4/30* | (2006.01) |

(52) U.S. Cl.
CPC .............. *H01B 1/22* (2013.01); *C03C 3/064* (2013.01); *C03C 3/066* (2013.01); *C03C 3/068* (2013.01); *C03C 8/02* (2013.01); *C03C 8/04* (2013.01); *C03C 8/18* (2013.01); *C09D 5/24* (2013.01); *H01B 1/16* (2013.01); *H01G 4/228* (2013.01); *H01G 4/2325* (2013.01); *H01G 4/30* (2013.01)

(58) Field of Classification Search
CPC ... H01B 1/16; H01B 1/22; C09D 5/24; C09D 11/52; C03C 3/062; C03C 3/064; C03C 3/066; C03C 3/068; C03C 4/14; C03C 4/20; C03C 8/02; C03C 8/04; C03C 8/18; C04B 2235/3215; H01G 4/228; H01G 4/4325; H01G 4/30; H01L 33/022425; H05K 1/092

See application file for complete search history.

(56) References Cited

U.S. PATENT DOCUMENTS

| | | | |
|---|---|---|---|
| 3,902,102 A | 8/1975 | Burn | |
| 4,376,725 A * | 3/1983 | Prabhu | ...................... C03C 8/02 252/512 |
| 4,766,027 A * | 8/1988 | Burn | ..................... B22F 1/0059 156/239 |
| 5,781,402 A * | 7/1998 | Fujiyama | .............. B22F 1/0007 361/305 |
| 7,083,744 B2 * | 8/2006 | Matsuno | .............. H01G 4/2325 252/512 |
| 7,368,070 B2 * | 5/2008 | Akimoto | ................ H01C 1/148 252/512 |
| 2016/0039711 A1 * | 2/2016 | Miyazaki | ............. H01G 4/2325 361/301.4 |

FOREIGN PATENT DOCUMENTS

| | | | |
|---|---|---|---|
| EP | 1443530 A1 | 8/2004 | |
| JP | S59184511 A | 10/1984 | |
| JP | H08055702 A | 2/1996 | |
| JP | H09055118 A | 2/1997 | |
| JP | 2002100526 A * | 4/2002 | ............ C03C 3/064 |
| JP | 2002163928 A | 6/2002 | |
| JP | 2004228075 A | 8/2004 | |
| JP | 2006228572 A | 8/2006 | |

(Continued)

OTHER PUBLICATIONS

English machine translation of Yamazoe et al. (JP 4423832 B2). (Year: 2010).*

(Continued)

*Primary Examiner* — Matthew R Diaz
(74) *Attorney, Agent, or Firm* — Alleman Hall Creasman & Tuttle LLP

(57) ABSTRACT

A conductive paste including a conductive powder, a glass frit, and an organic vehicle, wherein the conductive powder includes copper and/or nickel as a main component(s), and the glass frit is substantially free of Pb, Cd, and Bi, comprises 40 to 65% by mass of BaO, 15 to 23% by mass of $B_2O_3$, 2 to 12% by mass of $Al_2O_3$, 4 to 8% by mass of $SiO_2$, 0 to 5% by mass of ZnO, 0.5 to 7% by mass of $TiO_2$, 3 to 7.5% by mass of CaO, and comprises any one or more of $MnO_2$, CuO, and CoO in the ranges of 0 to 7% by mass of $MnO_2$, 0 to 16% by mass of CuO, and 0 to 5% by mass of CoO, in terms of oxide.

5 Claims, 3 Drawing Sheets

(56) References Cited

FOREIGN PATENT DOCUMENTS

| JP | 2007103845 A | * | 4/2007 | |
|---|---|---|---|---|
| JP | 4423832 B2 | * | 3/2010 | ............... C03C 8/02 |
| JP | 4423832 B2 | | 3/2010 | |
| TW | 200418221 A | | 9/2004 | |
| WO | 2014175013 A1 | | 10/2014 | |
| WO | WO-2014175013 A1 | * | 10/2014 | ........... H01G 4/2325 |

OTHER PUBLICATIONS

English language machine translation of Akagi et al. JP 2002-100526 A. (Year: 2002).*

English language machine translation of Touno et a. JP 2007-103845 A. (Year: 2007).*

European Patent Office, Extended European Search Report Issued in Application No. 16851417.2, dated Apr. 29, 2019, Germany, 8 pages.

ISA Japan Patent Office, International Search Report Issued in PCT Application No. PCT/JP2016/078219, dated Nov. 2, 2016, WIPO, 4 pages. (Submitted with English Translation of International Search Report).

Taiwan Intellectual Property Office, Office Action and Search Report Issued in Application No. 105131594, dated Dec. 24, 2019, 8 pages. (Submitted with Translation of Search Report).

* cited by examiner

CONDUCTIVE PASTE AND METHOD FOR FORMING TERMINAL ELECTRODES OF MULTILAYER CERAMIC COMPONENT

TECHNICAL FIELD

The present invention relates to a conductive paste useful for forming terminal electrodes of multilayer ceramic components such as multilayer ceramic capacitors and multilayer ceramic inductors. The present invention specifically relates to a conductive paste that is suitable for forming terminal electrodes of multilayer ceramic capacitors including internal electrodes containing nickel and/or copper as a main component(s) and that can be fired even in a non-oxidizing atmosphere.

BACKGROUND ART

Multilayer ceramic components are generally produced as follows. A plurality of unfired ceramic sheets such as dielectric and magnetic materials and a plurality of internal electrode paste layers are alternately laminated to obtain an unfired laminate. This laminate is cut and then fired at a high temperature to thereby obtain a ceramic element. Subsequently, a terminal electrode paste including a conductive powder and an inorganic binder powder such as a glass frit dispersed in a vehicle is applied by one of various methods such as dipping, brushing, and screen printing to end faces of the element where internal electrodes are exposed. After drying, firing is carried out at a high temperature to thereby form terminal electrodes electrically connected to the internal electrodes. Thereafter, a nickel plating layer, and additionally, a plating layer made of tin or an alloy thereof, which has satisfactory solderability, are formed on the terminal electrode as required.

As internal electrode materials, noble metals such as palladium, silver-palladium, and platinum have been used conventionally. However, as required from resource saving, cost cutting, and additionally, demands to prevent delamination and occurrence of cracks caused by oxidative expansion of palladium and the like, base metals such as nickel and copper are used as internal electrodes. For this reason, also in terminal electrodes, nickel and copper, which are likely to form satisfactory electrical connection with these internal electrode materials, are used. In order to prevent the conductivity from decreasing due to oxidization of the base metals constituting the internal electrodes and terminal electrodes, the firing is carried out in a non-oxidizing atmosphere, that is, in an inert atmosphere such as nitrogen and hydrogen-nitrogen or a reducing atmosphere at around 700 to 900° C., for example.

For such a conductive paste for forming terminal electrodes, it is necessary to use reduction-resistant glass stable even in the case of firing in a non-oxidizing atmosphere, as an inorganic binder. In the case of electroplating a terminal electrode film, an acidic electroplating solution may degenerate or dissolve a glass component to destroy the structure of glass. Thus, adhesion strength between the terminal electrode film and the ceramic element may significantly decrease.

Therefore, glass which has satisfactory acid resistance and is unlikely to be corroded by an acidic plating solution is required, and conventionally, reduction-resistant glasses such as glasses based on barium and on zinc have been mainly contemplated.

For example, in Patent Literature 1, base metal terminal electrodes of a multilayer ceramic capacitor are described, in which electrodes, reduction-resistant glasses such as barium borate glass, barium zinc borate glass, and barium zinc borosilicate glass are employed. Patent Literature 2 mentions that zinc borosilicate glass having a specific composition containing an alkali metal component and an alkali earth metal component is used for forming copper terminal electrodes. Patent Literature 3 mentions that aluminum strontium borosilicate glass is used for forming terminal electrodes.

Terminal electrodes formed by use of these glasses, however, has a problem in that its adhesion strength to the ceramic element is insufficient and, in particular, side portions having a small film thickness are likely to delaminate.

Additionally, a fired film to be obtained is porous, and thus, is susceptible to infiltration of a plating solution when the terminal electrodes are electroplated. As a result, the adhesion strength between the terminal electrodes and the ceramic element is significantly reduced, and cracking or reduction in the insulation resistance of the element is caused. Moreover, there has been a problem in that such infiltration leads to a so-called popcorn phenomenon, in which moisture in the plating solution evaporates and expands due to heating during component mounting to thereby cause a rupture of the terminal electrodes, reducing the reliability of the multilayer ceramic component.

As other glasses for forming terminal electrodes having satisfactory reduction resistance, alkali earth borosilicate glass described in Patent Literature 4 and alkali borosilicate glass described in Patent Literature 5 have been contemplated, but neither of them has sufficiently solved the problems aforementioned.

Patent Literature 6 by the present applicant discloses a glass composition for a thick film paste to be fired in a non-oxidizing atmosphere, which composition is free of lead, cadmium, or bismuth and comprises 35 to 60% by mass of BaO, 5 to 35% by mass of $B_2O_3$, 0 to 12% by mass of ZnO, 2 to 22% by mass of $MnO_2$, 0 to 18% by mass of $Al_2O_3$, 0 to 11% by mass of $SiO_2$, 0 to 8% by mass of one or more selected from $Li_2O$, $Na_2O$, and $K_2O$, 0 to 10% by mass of one or more selected from $Cu_2O$, $SnO_2$, $Fe_2O_3$, and $Co_3O_4$, 1 to 25% by mass of $TiO_2$, and 0 to 5% by mass of $ZrO_2$. Use of this glass composition can form dense terminal electrodes having sufficient adhesion strength to a substrate.

CITATION LIST

Patent Literature

[Patent Literature 1] U.S. Pat. No. 3,902,102
[Patent Literature 2] Japanese Patent Laid-Open No. 59-184511
[Patent Literature 3] Japanese Patent Laid-Open No. 9-55118
[Patent Literature 4] Japanese Patent Laid-Open No. 2004-228075
[Patent Literature 5] Japanese Patent Laid-Open No. 2006-228572
[Patent Literature 6] Japanese Patent No. 4423832

SUMMARY OF INVENTION

Technical Problem

According to the glass composition described in Patent Literature 6, a dense electrode film that is highly acid-resistant can be obtained, but further improvements in the performance have been required in recent years.

That is, it is an object of the present invention to provide a conductive paste that can form a dense electrode film having excellent acid resistance and being free from insufficient strength and infiltration of a plating solution, even in the case of firing in a non-oxidizing atmosphere.

Solution to Problem

The present inventors, while proceeding with investigation on glass compositions, have found that a dense electrode film having high acid resistance can be obtained when specific amounts of $TiO_2$ and CaO are contained simultaneously, thereby having completed the present invention based on such findings.

That is, the object described above can be achieved by a conductive paste comprising a conductive powder, a glass frit, and an organic vehicle, wherein the conductive powder contains copper and/or nickel as a main component(s), and the glass frit is substantially free of Pb, Cd, and Bi, comprises 40 to 65% by mass of BaO, 15 to 23% by mass of $B_2O_3$, 2 to 15% by mass of $Al_2O_3$, 4 to 8% by mass of $SiO_2$, 0 to 5% by mass of ZnO, 0.5 to 10% by mass of $TiO_2$, 3 to 7.5% by mass of CaO, and comprises any one or more of $MnO_2$, CuO, and CoO in the ranges of 0 to 7% by mass of $MnO_2$, 0 to 16% by mass of CuO, and 0 to 5% by mass of CoO, in terms of oxide.

Advantageous Effects of Invention

The glass frit according to the present invention has sufficient acid resistance in the glass itself. Thus, terminal electrodes of a multilayer ceramic component formed using a conductive paste containing this glass frit exhibit excellent acid resistance (plating-solution resistance), and thus a highly reliable multilayer ceramic component that is dense and causes no problems such as reduction in adhesion strength or delamination due to infiltration of a plating solution can be provided. Furthermore, the conductive paste according to the present invention can be fired even in a non-oxidizing atmosphere.

DESCRIPTION OF EMBODIMENT

Figure 1:
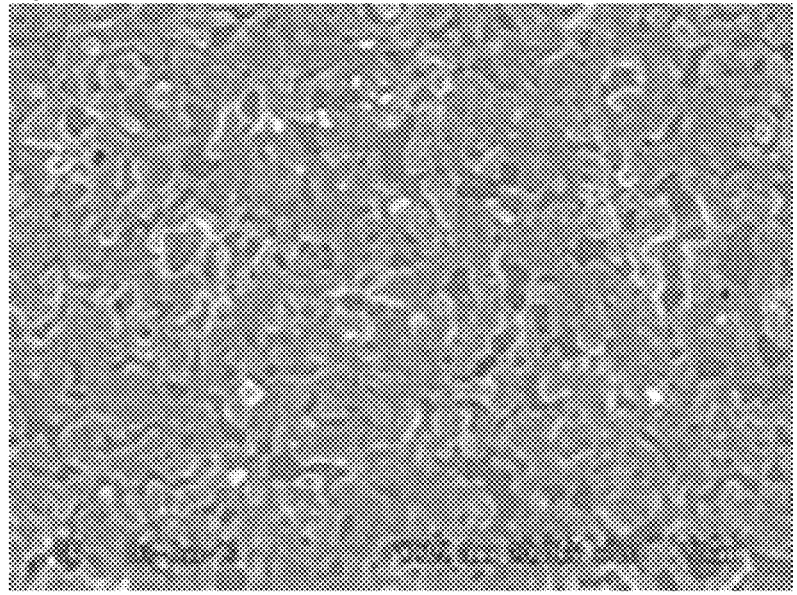
FIG. 1 is a SEM photograph of the center portion of an end face of a fired film of Experiment Example 2 (×700).

The conductive powder according to the conductive paste of the present invention is a metal powder containing copper and/or nickel as a main component(s). Examples thereof include, in addition to metal copper powder and metal nickel powder, alloy powder of copper and/or nickel and another metal, mixed powder of copper and/or nickel powder and another metal, composite powder in which inorganic material such as metal oxide, glass, and ceramic is present on the surface of copper and/or nickel powder, and composite powder in which the surface of powder such as metal oxide, glass, and ceramic or other metal powder is coated with copper and/or nickel.

The glass frit according to the conductive paste of the present invention is substantially free of Pb, Cd, and Bi, comprises 40 to 65% by mass of BaO, 15 to 23% by mass of $B_2O_3$, 2 to 12% by mass of $Al_2O_3$, 4 to 8% by mass of $SiO_2$, 0 to 5% by mass of ZnO, 0.5 to 7% by mass of $TiO_2$, 3 to 7.5% by mass of CaO, and comprises any one or more of $MnO_2$, CuO, and CoO in the ranges of 0 to 7% by mass of $MnO_2$, 0 to 16% by mass of CuO, and 0 to 5% by mass of CoO, in terms of oxide. The glass frit according to the conductive paste of the present invention, preferably, is substantially free of Pb, Cd, and Bi, comprises 40 to 65% by mass of BaO, 15 to 23% by mass of $B_2O_3$, 2 to 12% by mass of $Al_2O_3$, 4 to 8% by mass of $SiO_2$, 0 to 5% by mass of ZnO, 0.5 to 7% by mass of $TiO_2$, 3 to 7.5% by mass of CaO, and comprises any one or more of $MnO_2$, CuO, and CoO in the ranges of 0.5 to 5% by mass of $MnO_2$, 6 to 13% by mass of CuO, and 0.5 to 4% by mass of CoO, in terms of oxide.

Note that the "main component" herein means a component of which content exceeds 50% by mass. For example, a "metal powder containing copper and/or nickel as a main component(s)" refers to one that contains at least one of copper and nickel in a metal powder and additionally has a total content of the copper and nickel of more than 50% by mass.

The glass frit according to the conductive paste of the present invention is substantially free of Pb, Cd, and Bi. Note that "be substantially free of" does not refer to not containing Pb, Cd, and Bi at all. Unless the working effect of the present invention is compromised, Pb, Cd, and Bi may be contained in the range of 1000 ppm or less in terms of oxide. When contained in glass frit, Pb, Cd, and Bi are contained in oxide forms such as PbO, CdO, and $Bi_2O_3$. The glass frit according to the conductive paste of the present invention may contain 1000 ppm or less of each of Pb, Cd, and Bi in terms of oxide, unless the working effect of the present invention is compromised. The total content of Pb, Cd, and Bi is preferably 1000 ppm or less in terms of oxide. The content described above of each Pb, Cd, and Bi is the content when converted to PbO, CdO, and $Bi_2O_3$, respectively.

Numerical ranges represented with the term "to" refer to ranges inclusive of the numbers that respectively appear at before and after "to", unless otherwise indicated.

$SiO_2$ and $B_2O_3$ serve as glass forming components. The glass frit according to the present invention contains 4 to 8% by mass of $SiO_2$ and 15 to 23% by mass of $B_2O_3$. When the content of $SiO_2$ falls below this range, the acid resistance of the glass decreases. When the content exceeds this range, the viscosity increases, and thus sintering becomes difficult. When the content of $B_2O_3$ falls below this range, glass formation becomes difficult. When the content exceeds this range, the acid resistance and water resistance decrease, and thus the plating solution resistance is reduced. The content of $SiO_2$ ranges preferably from 4 to 7% by mass, and the content of $B_2O_3$ ranges preferably from 15 to 21% by mass.

$Al_2O_3$ and $TiO_2$ serve as components that improve the acid resistance while assisting glass formation. The glass frit according to the present invention contains 2 to 12% by mass of $Al_2O_3$ and 0.5 to 7% by mass of $TiO_2$. When the content of $Al_2O_3$ and $TiO_2$ falls below this range, the acid resistance of the glass decreases. When the content exceeds the range, the glass becomes likely to crystallize. The content of $Al_2O_3$ ranges preferably from 6 to 12% by mass, and the content of $TiO_2$ ranges preferably from 1 to 7% by mass.

BaO serves as a component that lowers the softening point of the glass and enhances the wettability to the conductive powder by a decrease in the viscosity. The glass frit according to the present invention contains 40 to 65% by mass of BaO. When the content of BaO falls below this range, the softening point increases to thereby reduce the wettability to the conductive powder. When the content exceeds this range, glass formation is inhibited. The content of BaO ranges preferably from 42 to 60% by mass.

CaO serves as a component that controls the viscosity of the glass. The glass frit according to the present invention contains 3 to 7.5% by mass of CaO. When the content of CaO falls below this range, the viscosity of the glass becomes likely to decrease. When the content exceeds this range, the viscosity of the glass increases to thereby reduce the wettability to the conductive powder. The content of CaO ranges preferably from 3 to 6% by mass.

$MnO_2$ is not an essential component, but the glass frit according to the present invention can contain $MnO_2$ if in the range of 7% by mass or less. Containing $MnO_2$ facilitates glass formation, but when the content of $MnO_2$ exceeds 7% by mass, the viscous behavior of the glass at high temperatures becomes unstable.

CuO is not an essential component, but the glass frit according to the present invention can contain CuO if in the range of 16% by mass or less. Containing CuO enhances the wettability between the glass and the conductive powder and also enhances the denseness of a film. When the content of CuO exceeds 16% by mass, the glass becomes likely to crystallize, and as a result, the conductive powder is inhomogeneously dispersed.

CoO is not an essential component, but the glass frit according to the present invention can contain CoO if in the range of 5% by mass or less. Containing CoO facilitates glass formation, but when the content of CoO exceeds 5% by mass, the glass becomes likely to crystallize.

The glass frit according to the present invention contains any one or more of $MnO_2$, CuO, and CoO as an essential component(s). In glass frit according to the present invention, the content of $MnO_2$ is 0 to 7% by mass, the content of CuO is 0 to 16% by mass, and the content of CoO is 0 to 5% by mass. When the glass frit according to the present invention contains any one or more of $MnO_2$, CuO, and CoO as an essential component(s) in the range, the conductive paste of the present invention can provide an electrode film that has satisfactory debinding properties, has a small amount of residual carbon in the film, is dense, and is free from deterioration in electrical properties, even in the case of firing under a non-oxidizing atmosphere. Preferably, the content of $MnO_2$ is 0.5 to 5% by mass, the content of CuO is 6 to 13% by mass, and the content of CoO is 0.5 to 4% by mass.

ZnO is not an essential component, but the glass frit according to the present invention can contain ZnO if in the range of 5% by mass or less. Containing ZnO facilitates glass formation, but when the content of ZnO exceeds 5% by mass, the reduction resistance of the glass tends to decrease. The content of ZnO is preferably 3% by mass or less.

$Li_2O$ is not an essential component, but the glass frit according to the present invention can contain $Li_2O$ if in the range of 1% by mass or less. Containing $Li_2O$ lowers the softening point of the glass, but when the content of $Li_2O$ exceeds 1% by mass, a glass puddle becomes likely to generate. The content of $Li_2O$ is preferably 0.8% by mass or less.

$Ga_2O_3$ is not an essential component, but the glass frit according to the present invention can contain $Ga_2O_3$ if in the range of 7% by mass or less. Containing $Ga_2O_3$ facilitates glass formation, and an effect of enhancing the wettability to the conductive powder is promising. However, when the content of $Ga_2O_3$ exceeds 7% by mass, a glass puddle becomes likely to generate. The content of $Ga_2O_3$ is preferably 5% by mass or less.

$La_2O_3$ is not an essential component, but the glass frit according to the present invention can contain $La_2O_3$ if in the range of 3% by mass or less. Containing $La_2O_3$ enhances the acid resistance, but when the content of $La_2O_3$ exceeds 3% by mass, the glass becomes likely to crystallize. The content of $La_2O_3$ is preferably 1.5% by mass or less.

NiO, $CeO_2$, $Fe_2O_3$, and $V_2O_3$ are not essential components, but the glass frit according to the present invention can contain NiO if in the range of 1% by mass or less, $CeO_2$ if in the range of 2% by mass or less, $Fe_2O_3$ if in the range of 1% by mass or less, and $V_2O_3$ if in the range of 1.5% by mass or less. Containing these facilitates glass formation, but when the content of NiO, $CeO_2$, $Fe_2O_3$, or $V_2O_3$ exceeds the range described above, the viscous behavior of the glass at high temperatures becomes likely to be unstable. The content of each of NiO, $CeO_2$, $Fe_2O_3$, and $V_2O_3$ is preferably 0.8% by mass or less.

The glass frit according to the present invention can further contain a small amount of other oxide such as $Na_2O$, $K_2O$, Cs2O, MgO, SrO, $ZrO_2$, $Nb_2O_5$, SnO or $SnO_2$, $Ta_2O_5$, $Pr_6O_{11}$, $Tb_4O_7$, $Ag_2O$, $TeO_2$, $P_2O_5$ or the like, in the range not affecting the working effect of the present invention.

Note that the glass frit according to the present invention is substantially free of Pb, Cd, and Bi. $MoO_3$ may be scattered during firing in some cases, and the composition stability of the glass deteriorates. Thus, the glass frit according to the present invention is preferably substantially free of Mo.

Examples of a production process of the glass frit according to the conductive paste of the present invention include common production processes such as mixing, melting, quenching, and grinding the raw material compound of each component and also include processes such as a sol-gel method, a spray pyrolysis method, and an atomizing method. In particular, the spray pyrolysis method is preferred because the method provides fine spherical glass frit having a homogeneous particle size, which requires no grinding treatment when used for a conductive paste.

The blending ratio of the glass frit described above to the conductive powder is not particularly limited, and about 1 to 20 parts by mass of the glass frit is generally blended to 100 parts by mass of the conductive powder.

The organic vehicle according to the conductive paste of the present invention is not particularly limited, and an organic binder, a solvent or the like generally used as an organic vehicle of conductive pastes is selected as appropriate. Examples of the organic binder include celluloses, acrylic resin, phenol resin, alkyd resin, and rosin ester, and examples of the solvent include organic solvents such as alcohol-based, ether-based, ester-based, and hydrocarbon-based organic solvents, water, and mixed solvents thereof. The amount of the organic vehicle blended is not particularly limited, and adjusted as appropriate in an appropriate amount at which inorganic components can be retained in the paste, depending on the usages and application method.

In addition, the conductive paste of the present invention can contain plasticizers, dispersants such as higher fatty acids or fatty acid esters, and surfactants that are added to common conductive pastes, as appropriate.

In addition to the components described above, the conductive paste of the present invention can contain inorganic components blended in common conductive pastes, for example metal oxides such as alumina, silica, copper oxide, manganese oxide, barium titanate, and titanium oxide, a ceramic powder having the same nature as the dielectric layers, and montmorillonite, as appropriate, depending on the purpose.

EXAMPLES

The present invention will be described specifically hereinbelow, but the present invention is not restricted thereby.

Experiment Example 1

Glass raw materials were each formulated so as to achieve the oxide composition in terms of oxide shown in Table 1, melted at 1200° C. using a platinum crucible, and ground after air-cooling or quenching to thereby obtain a glass powder of sample 1.

The obtained glass powder of sample 1 was subjected to acid resistance test as mentioned below.

First, 10 parts by mass of the glass powder of sample 1 was dispersed in 3 parts by mass of a vehicle prepared by dissolving an acrylic-resin-based binder in terpineol to prepare a paste. This paste was printed onto an alumina substrate, dried, and then fired in a nitrogen atmosphere having an oxygen concentration of 50 ppm (non-oxidizing atmosphere) at 800° C. to thereby form a glass coating film having a film thickness of about 20 μm.

Subsequently, the substrate having the glass coating film formed thereon was immersed in an acidic organic tin-plating bath having a pH of about 4 for two hours. The weight change before and after immersion was used to determine the residual ratio of glass coating films (% by mass). Those having a residual ratio of 50% or more were rated as ⊚, those having a residual ratio of 30% or more and less than 50% as ○, and those having a residual ratio less than 30% as x. The measurement results were also described in Table 1.

Experiment Example 2 to 36

Glass powders of samples 2 to 36 were prepared in the same manner as in Experiment Example 1 except that the oxide compositions in terms of oxide were as shown in Table 1, and then, the samples were subjected to acid resistance test. The measurement results were also described in Table 1.

[Table 1]

TABLE 1

|  | Experiment Example | Glass sample | BaO | $B_2O_3$ | $Al_2O_3$ | $SiO_2$ | ZnO | $TiO_2$ | CaO | $MnO_2$ | CuO | CoO | $Li_2O$ | $Ga_2O_3$ | $La_2O_3$ |
|---|---|---|---|---|---|---|---|---|---|---|---|---|---|---|---|
| * | 1 | Sample 1 | 56.1 | 20.4 | 8.5 | 5.2 | 4.5 | 0.6 | 4.7 | 0.0 | 0.0 | 0.0 | 0.0 | 0.0 | 0.0 |
|  | 2 | Sample 2 | 53.2 | 17.0 | 9.7 | 4.8 | 0.0 | 2.6 | 3.5 | 0.0 | 6.4 | 0.0 | 0.5 | 2.3 | 0.0 |
|  | 3 | Sample 3 | 53.0 | 19.4 | 7.8 | 5.1 | 0.0 | 2.7 | 4.7 | 0.0 | 5.4 | 0.0 | 0.5 | 0.0 | 1.4 |
| * | 4 | Sample 4 | 47.6 | 20.7 | 8.7 | 6.7 | 8.1 | 0.0 | 8.2 | 0.0 | 0.0 | 0.0 | 0.0 | 0.0 | 0.0 |
|  | 5 | Sample 5 | 47.5 | 17.3 | 7.4 | 4.5 | 0.0 | 2.4 | 4.2 | 0.0 | 15.0 | 0.0 | 0.5 | 0.0 | 1.2 |
|  | 6 | Sample 6 | 48.4 | 17.7 | 9.4 | 4.6 | 0.0 | 2.5 | 4.3 | 0.0 | 9.2 | 1.2 | 0.5 | 2.2 | 0.0 |
|  | 7 | Sample 7 | 50.0 | 17.5 | 7.8 | 4.5 | 0.0 | 1.6 | 4.2 | 0.0 | 12.0 | 0.0 | 0.3 | 2.1 | 0.0 |
|  | 8 | Sample 8 | 49.9 | 18.3 | 9.6 | 4.8 | 0.0 | 2.5 | 4.5 | 1.4 | 6.3 | 0.0 | 0.5 | 2.2 | 0.0 |
| * | 9 | Sample 9 | 53.4 | 18.8 | 13.0 | 4.8 | 4.7 | 1.0 | 4.3 | 0.0 | 0.0 | 0.0 | 0.0 | 0.0 | 0.0 |
| * | 10 | Sample 10 | 50.4 | 18.4 | 11.7 | 4.7 | 0.0 | 8.5 | 4.2 | 0.0 | 0.0 | 0.0 | 2.1 | 0.0 | 0.0 |
| * | 11 | Sample 11 | 53.6 | 19.8 | 8.3 | 5.2 | 0.0 | 3.4 | 4.3 | 0.0 | 0.0 | 0.0 | 0.6 | 4.8 | 0.0 |
| * | 12 | Sample 12 | 58.8 | 20.4 | 7.6 | 7.4 | 0.0 | 0.7 | 5.1 | 0.0 | 0.0 | 0.0 | 0.0 | 0.0 | 0.0 |
| * | 13 | Sample 13 | 55.9 | 20.4 | 8.0 | 5.3 | 0.7 | 2.8 | 5.0 | 0.0 | 0.0 | 0.0 | 0.5 | 0.0 | 1.4 |
| * | 14 | Sample 14 | 54.9 | 19.1 | 7.4 | 6.9 | 0.0 | 6.9 | 4.8 | 0.0 | 0.0 | 0.0 | 0.0 | 0.0 | 0.0 |
|  | 15 | Sample 15 | 55.0 | 20.4 | 8.5 | 5.3 | 0.0 | 3.5 | 4.5 | 0.0 | 2.1 | 0.0 | 0.7 | 0.0 | 0.0 |
| * | 16 | Sample 16 | 55.1 | 20.0 | 8.5 | 5.2 | 0.0 | 3.8 | 4.6 | 0.0 | 0.0 | 0.0 | 0.7 | 0.0 | 0.0 |
| * | 17 | Sample 17 | 42.1 | 15.3 | 15.9 | 3.9 | 19.3 | 0.0 | 3.5 | 0.0 | 0.0 | 0.0 | 0.0 | 0.0 | 0.0 |
|  | 18 | Sample 18 | 55.4 | 20.2 | 8.0 | 5.3 | 0.0 | 2.8 | 4.9 | 0.0 | 0.7 | 0.0 | 0.5 | 0.8 | 1.4 |
| * | 19 | Sample 19 | 55.4 | 20.1 | 8.5 | 5.2 | 0.0 | 3.8 | 4.6 | 0.0 | 0.0 | 0.0 | 0.7 | 0.0 | 0.0 |
| * | 20 | Sample 20 | 56.1 | 20.5 | 8.0 | 5.4 | 0.2 | 2.8 | 5.0 | 0.0 | 0.0 | 0.0 | 0.5 | 0.0 | 1.5 |
| * | 21 | Sample 21 | 0.0 | 19.2 | 7.4 | 7.0 | 0.0 | 2.1 | 0.0 | 0.0 | 0.0 | 0.0 | 0.0 | 0.0 | 0.0 |
|  | 22 | Sample 22 | 55.9 | 20.4 | 8.0 | 5.3 | 0.0 | 2.8 | 5.0 | 0.0 | 0.0 | 0.0 | 0.5 | 0.0 | 1.4 |
| * | 23 | Sample 23 | 55.8 | 20.3 | 8.6 | 5.2 | 0.0 | 3.9 | 4.7 | 0.0 | 0.0 | 0.0 | 0.7 | 0.0 | 0.0 |
| * | 24 | Sample 24 | 51.2 | 18.6 | 10.9 | 4.7 | 7.4 | 0.6 | 4.2 | 2.4 | 0.0 | 0.0 | 0.0 | 0.0 | 0.0 |
|  | 25 | Sample 25 | 45.4 | 15.5 | 7.7 | 4.5 | 0.0 | 4.0 | 4.2 | 0.0 | 15.9 | 0.0 | 0.7 | 2.1 | 0.0 |
| * | 26 | Sample 26 | 46.0 | 16.8 | 7.3 | 4.4 | 0.0 | 2.3 | 4.1 | 0.0 | 17.5 | 0.0 | 0.4 | 0.0 | 1.2 |
| * | 27 | Sample 27 | 47.4 | 23.2 | 8.1 | 8.4 | 0.0 | 0.0 | 12.9 | 0.0 | 0.0 | 0.0 | 0.0 | 0.0 | 0.0 |
| * | 28 | Sample 28 | 55.5 | 20.0 | 7.9 | 7.2 | 0.0 | 2.2 | 7.2 | 0.0 | 0.0 | 0.0 | 0.0 | 0.0 | 0.0 |
| * | 29 | Sample 29 | 55.7 | 20.3 | 8.6 | 5.2 | 0.0 | 3.9 | 4.7 | 0.0 | 0.0 | 0.0 | 0.7 | 0.0 | 0.0 |
| * | 30 | Sample 30 | 53.6 | 21.8 | 7.9 | 7.9 | 0.0 | 0.0 | 8.8 | 0.0 | 0.0 | 0.0 | 0.0 | 0.0 | 0.0 |
|  | 31 | Sample 31 | 56.8 | 19.6 | 7.4 | 7.0 | 0.0 | 0.6 | 4.8 | 3.8 | 0.0 | 0.0 | 0.0 | 0.0 | 0.0 |
|  | 32 | Sample 32 | 56.8 | 19.7 | 7.4 | 7.1 | 0.0 | 0.7 | 4.8 | 0.0 | 0.0 | 3.5 | 0.0 | 0.0 | 0.0 |
| * | 33 | Sample 33 | 51.4 | 18.8 | 13.0 | 4.8 | 7.7 | 0.0 | 4.3 | 0.0 | 0.0 | 0.0 | 0.0 | 0.0 | 0.0 |
| * | 34 | Sample 34 | 60.1 | 20.7 | 3.7 | 7.4 | 0.0 | 0.6 | 5.1 | 0.0 | 0.0 | 0.0 | 0.0 | 0.0 | 0.0 |
| * | 35 | Sample 35 | 60.2 | 20.9 | 3.8 | 7.5 | 0.0 | 0.0 | 5.2 | 2.5 | 0.0 | 0.0 | 0.0 | 0.0 | 0.0 |
| * | 36 | Sample 36 | 55.0 | 23.0 | 7.0 | 8.0 | 0.0 | 3.5 | 0.0 | 3.5 | 0.0 | 0.0 | 0.0 | 0.0 | 0.0 |

|  | Experiment Example | NiO | $CeO_2$ | $Fe_2O_3$ | $V_2O_5$ | PbO | CdO | $Bi_2O_3$ | Others | Acid resistance | Denseness | Debinding properties |
|---|---|---|---|---|---|---|---|---|---|---|---|---|
| * | 1 | 0.0 | 0.0 | 0.0 | 0.0 | 0.0 | 0.0 | 0.0 | — | ○ | ○ | Δ |
|  | 2 | 0.0 | 0.0 | 0.0 | 0.0 | 0.0 | 0.0 | 0.0 | — | ⊚ | ⊚ | ⊚ |

TABLE 1-continued

| | | | | | | | | | | | | |
|---|---|---|---|---|---|---|---|---|---|---|---|---|
| | 3 | 0.0 | 0.0 | 0.0 | 0.0 | 0.0 | 0.0 | 0.0 | — | ⊙ | ○ | ○ |
| * | 4 | 0.0 | 0.0 | 0.0 | 0.0 | 0.0 | 0.0 | 0.0 | — | X | ○ | ○ |
| | 5 | 0.0 | 0.0 | 0.0 | 0.0 | 0.0 | 0.0 | 0.0 | — | ⊙ | ○ | ○ |
| | 6 | 0.0 | 0.0 | 0.0 | 0.0 | 0.0 | 0.0 | 0.0 | — | ⊙ | ⊙ | ⊙ |
| | 7 | 0.0 | 0.0 | 0.0 | 0.0 | 0.0 | 0.0 | 0.0 | — | ⊙ | ⊙ | ⊙ |
| | 8 | 0.0 | 0.0 | 0.0 | 0.0 | 0.0 | 0.0 | 0.0 | — | ⊙ | ⊙ | ⊙ |
| * | 9 | 0.0 | 0.0 | 0.0 | 0.0 | 0.0 | 0.0 | 0.0 | — | ⊙ | Δ | ○ |
| * | 10 | 0.0 | 0.0 | 0.0 | 0.0 | 0.0 | 0.0 | 0.0 | — | ⊙ | Δ | ○ |
| * | 11 | 0.0 | 0.0 | 0.0 | 0.0 | 0.0 | 0.0 | 0.0 | — | ⊙ | ○ | Δ |
| * | 12 | 0.0 | 0.0 | 0.0 | 0.0 | 0.0 | 0.0 | 0.0 | — | ○ | ○ | Δ |
| * | 13 | 0.0 | 0.0 | 0.0 | 0.0 | 0.0 | 0.0 | 0.0 | — | ⊙ | ○ | Δ |
| * | 14 | 0.0 | 0.0 | 0.0 | 0.0 | 0.0 | 0.0 | 0.0 | — | ⊙ | ○ | Δ |
| | 15 | 0.0 | 0.0 | 0.0 | 0.0 | 0.0 | 0.0 | 0.0 | — | ⊙ | ○ | ○ |
| * | 16 | 0.0 | 0.0 | 0.0 | 0.0 | 0.0 | 0.0 | 0.0 | $Ta_2O_5$ 2.1 | ⊙ | ○ | Δ |
| * | 17 | 0.0 | 0.0 | 0.0 | 0.0 | 0.0 | 0.0 | 0.0 | — | X | X | Δ |
| | 18 | 0.0 | 0.0 | 0.0 | 0.0 | 0.0 | 0.0 | 0.0 | — | ⊙ | ○ | ○ |
| * | 19 | 0.0 | 1.7 | 0.0 | 0.0 | 0.0 | 0.0 | 0.0 | — | ⊙ | ○ | Δ |
| * | 20 | 0.0 | 0.0 | 0.0 | 0.0 | 0.0 | 0.0 | 0.0 | — | ⊙ | ○ | Δ |
| * | 21 | 0.0 | 0.0 | 0.0 | 0.0 | 0.0 | 0.0 | 0.0 | SrO 8.9 | ○ | X | Δ |
| * | 22 | 0.7 | 0.0 | 0.0 | 0.0 | 0.0 | 0.0 | 0.0 | — | ⊙ | ○ | Δ |
| * | 23 | 0.0 | 0.0 | 0.8 | 0.0 | 0.0 | 0.0 | 0.0 | — | ⊙ | ○ | Δ |
| * | 24 | 0.0 | 0.0 | 0.0 | 0.0 | 0.0 | 0.0 | 0.0 | — | X | Δ | ⊙ |
| | 25 | 0.0 | 0.0 | 0.0 | 0.0 | 0.0 | 0.0 | 0.0 | — | ⊙ | ○ | ○ |
| * | 26 | 0.0 | 0.0 | 0.0 | 0.0 | 0.0 | 0.0 | 0.0 | — | X | Δ | ○ |
| * | 27 | 0.0 | 0.0 | 0.0 | 0.0 | 0.0 | 0.0 | 0.0 | — | X | X | Δ |
| * | 28 | 0.0 | 0.0 | 0.0 | 0.0 | 0.0 | 0.0 | 0.0 | — | ⊙ | ○ | Δ |
| * | 29 | 0.0 | 0.0 | 0.0 | 0.9 | 0.0 | 0.0 | 0.0 | — | ⊙ | ○ | Δ |
| * | 30 | 0.0 | 0.0 | 0.0 | 0.0 | 0.0 | 0.0 | 0.0 | — | X | X | Δ |
| | 31 | 0.0 | 0.0 | 0.0 | 0.0 | 0.0 | 0.0 | 0.0 | — | ⊙ | ○ | ⊙ |
| | 32 | 0.0 | 0.0 | 0.0 | 0.0 | 0.0 | 0.0 | 0.0 | — | ⊙ | ○ | ⊙ |
| * | 33 | 0.0 | 0.0 | 0.0 | 0.0 | 0.0 | 0.0 | 0.0 | — | X | Δ | Δ |
| * | 34 | 0.0 | 0.0 | 0.0 | 0.0 | 0.0 | 0.0 | 0.0 | $Nb_2O_5$ 2.4 | ○ | ○ | Δ |
| * | 35 | 0.0 | 0.0 | 0.0 | 0.0 | 0.0 | 0.0 | 0.0 | — | ○ | X | ○ |
| * | 36 | 0.0 | 0.0 | 0.0 | 0.0 | 0.0 | 0.0 | 0.0 | — | ○ | Δ | ○ |

[% by mass]

[Denseness of Fired Film]

Conductive pastes were prepared by kneading 12 parts by mass of the glass powder of each of samples 1 to 36 and 100 parts by mass of a copper powder together with 30 parts by mass of a vehicle prepared by dissolving an acrylic-resin-based binder in terpineol in a roll mill.

Each of these conductive pastes was applied by a dipping method onto a terminal portions of the surface of a multi-layer ceramic capacitor element (external dimensions=3.2 mm×2.5 mm×2.5 mm) having a nickel internal electrode so as to achieve a fired film thickness of 100 μm. After drying, firing was carried out in a nitrogen atmosphere having an oxygen concentration of 50 ppm at 800° C. to form terminal electrodes.

A cross section and a surface of the terminal electrodes of the obtained multilayer ceramic capacitor were observed with a scanning electron microscope (hereinbelow, referred to as SEM) to check the denseness of the electrode.

Figure 2:
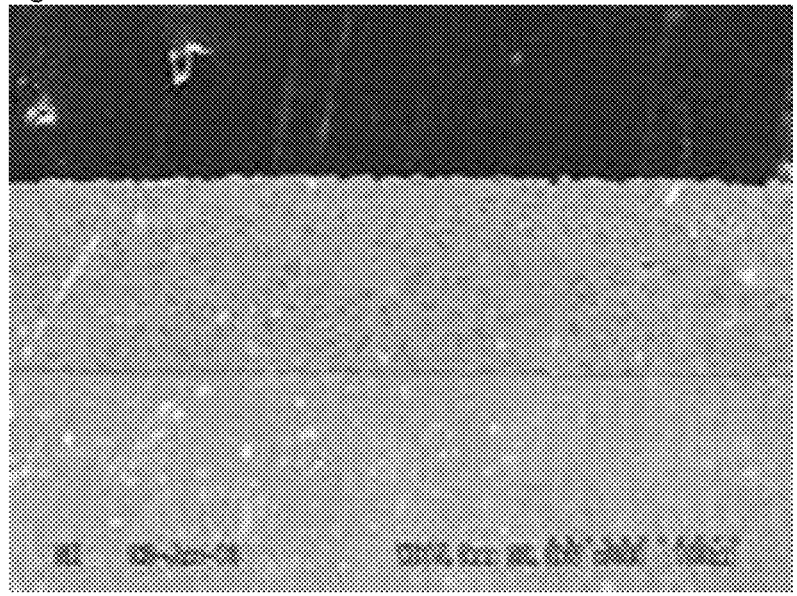
FIG. 2 is a SEM photograph of a cross section of the fired film of Experiment Example 2 (×500).

FIGS. 1 to 2 are images observed by a SEM of the surface and the cross section of the electrode obtained in Experiment Example 2. Similarly, FIGS. 3 to 4 are images observed by a SEM of the surface and the cross section of the electrode obtained in Experiment Example 12, and FIGS. 5 to 6 are images observed by a SEM of the surface and the cross section of the electrode obtained in Experiment Example 30.

Figure 3:
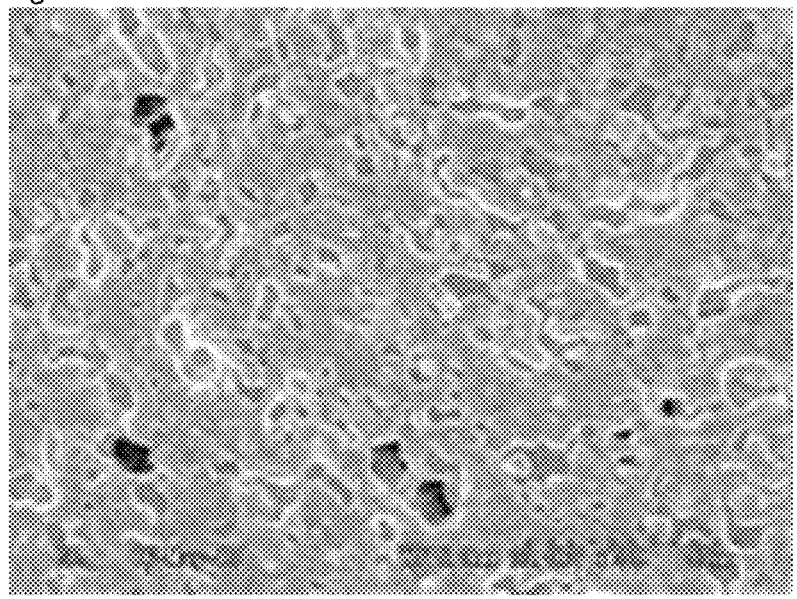
FIG. 3 is a SEM photograph of the center portion of an end face of a fired film of Experiment Example 12 (×700).
Figure 4:
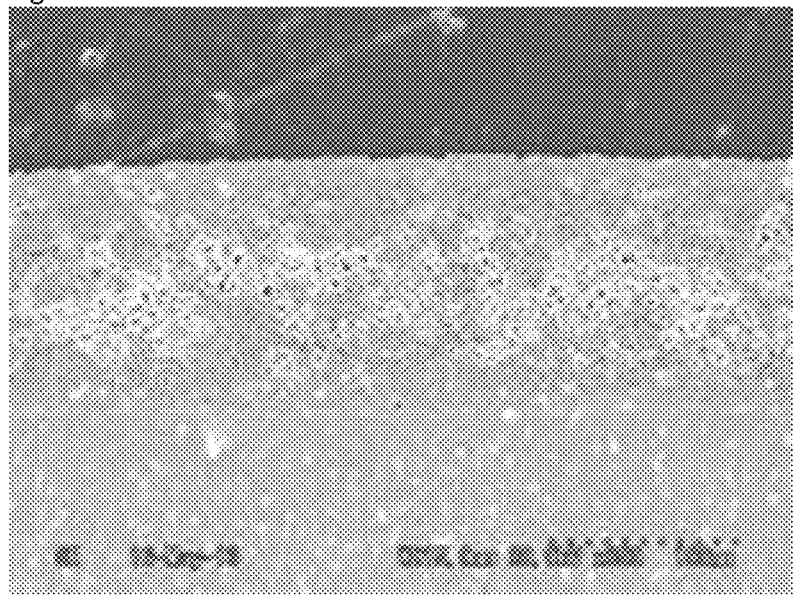
FIG. 4 is a SEM photograph of a cross section of the fired film of Experiment Example 12 (×500).
Figure 5:
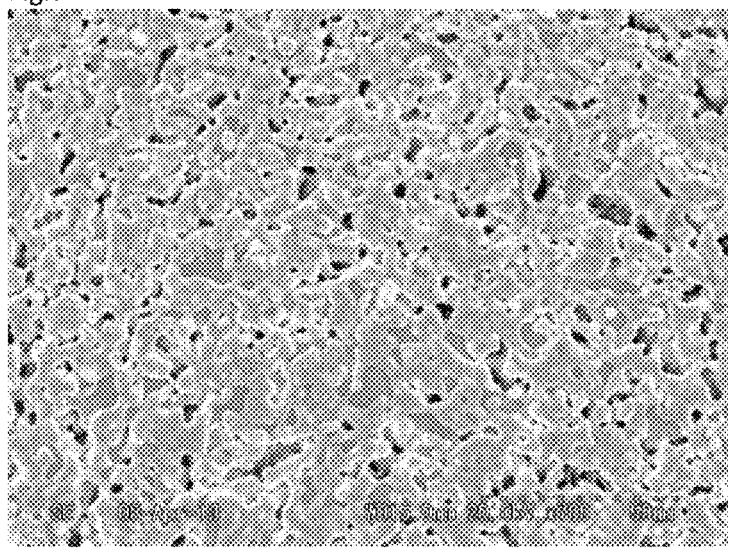
FIG. 5 is a SEM photograph of the center portion of an end face of a fired film of Experiment Example 30 (×700).
Figure 6:
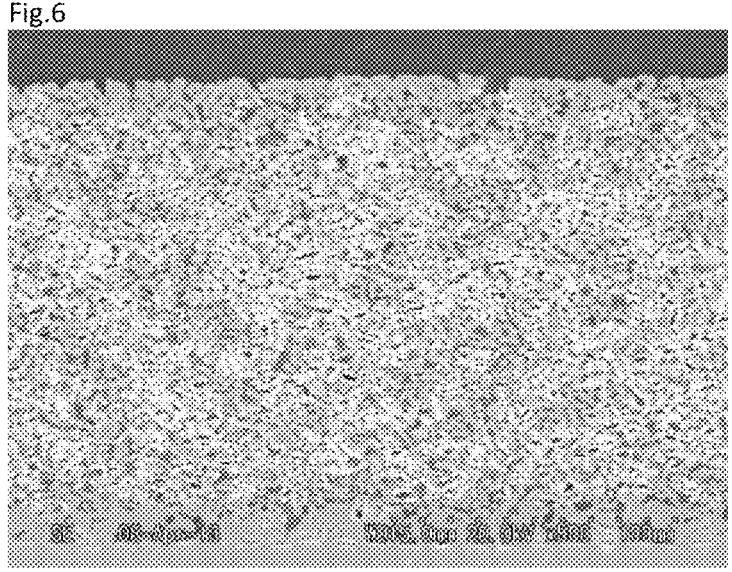
FIG. 6 is a SEM photograph of a cross section of the fired film of Experiment Example 30 (×500).

Electrodes having substantially no small holes (pores) on the surface and the cross section thereof as shown in FIGS. 1 to 2 were rated as ⊚, those having pores only slightly, but having no practical problem in use as shown in FIGS. 3 to 4 were rated as ○, and those having pores thereon entirely as shown in FIGS. 5 to 6 were rated as x, and the results were also described in Table 1.

[Debinding Properties]

The glass powder of each of samples 1 to 36 and a vehicle prepared by dissolving an acrylic-resin-based binder in terpineol were kneaded in a three roll mill to prepare a glass paste. This paste was screen-printed on an alumina substrate, fired in a nitrogen atmosphere at each temperature of 700° C., 750° C., 800° C., and 850° C., and then, the debinding properties were checked.

The presence of a gray-blackening phenomenon due to residual carbon was visually evaluated. Those showing no gray-blackening were rated as ⊚, those that may show slightly gray-blackening depending on the firing temperature but have completely no practical problem in use were rated as ○, those showing gray-blackening depending on the firing temperature but having no practical problem in use were rated as Δ, and those showing gray-blackening and being not suitable for practical use were rated as x, and the results were also shown in Table 1.

As aforementioned, according to the present invention, a dense fired film having excellent acid resistance can be obtained even in the case of firing in a non-oxidizing atmosphere. Thus, it is possible to form terminal electrodes resistant to infiltration of a plating solution and having excellent plating solution resistance.

The invention claimed is:

1. A conductive paste comprising a conductive powder, a glass frit, and an organic vehicle, wherein
   the conductive powder comprises at least one of copper and nickel, wherein a total content of copper and nickel in the conductive powder exceeds 50% by mass, and
   the glass frit contains 1000 ppm or less of each of Pb, Cd, and Bi in terms of oxide, and comprises 40 to 65% by mass of BaO, 15 to 23% by mass of $B_2O_3$, 2 to 12% by mass of $Al_2O_3$, 4 to 8% by mass of $SiO_2$, 0 to 5% by mass of ZnO, 0.5 to 7% by mass of $TiO_2$, 3 to 7.5% by mass of CaO, and 6 to 13% by mass of CuO.

2. The conductive paste according to claim 1, wherein the glass frit further comprises any one or more of $MnO_2$ and CoO in the ranges of 0.5 to 5% by mass of $MnO_2$ and 0.5 to 4% by mass of CoO.

3. The conductive paste according to claim 1, wherein the glass frit further comprises any one or more of $Li_2O$, $Ga_2O_3$, NiO, $CeO_2$, $La_2O_3$, $Fe_2O_3$, and $V_2O_5$ in the ranges of 1% by mass or less of $Li_2O$, 7% by mass or less of $Ga_2O_3$, 1% by mass or less of NiO, 0 to 2% by mass of $CeO_2$, 3% by mass or less of $La_2O_3$, 1% by mass or less of $Fe_2O_3$, and 1.5% by mass or less of $V_2O_5$, in terms of oxide.

4. The conductive paste according to claim 1, being for forming terminal electrodes of a multilayer ceramic component.

5. The conductive paste according to claim 1, further comprising any one or more of $MnO_2$ and CoO in the ranges of 7% by mass or less of $MnO_2$ and 5% by mass or less of CoO.

\* \* \* \* \*